James D. Kennedy
INVENTOR

ATTORNEY

United States Patent Office 3,487,304
Patented Dec. 30, 1969

3,487,304
SEQUENTIAL TEST APPARATUS FOR ELECTRICAL CIRCUITS INCLUDING A DIGITAL CONTROLLED ANALOG TEST SIGNAL GENERATING UNIT
James D. Kennedy, Westlake Village, Calif., assignor to AAI Corporation, Cockeysville, Md., a corporation of Maryland
Filed Feb. 2, 1968, Ser. No. 702,696
Int. Cl. G01r 31/28
U.S. Cl. 324—73                                    4 Claims

ABSTRACT OF THE DISCLOSURE

A test apparatus is disclosed wherein a coded test program stored in a memory unit is fed to a decoder and changed into a series of digital signals which are supplied to a system control unit which directs different test data to selected forcing function units and control instructions to a switching matrix which connects selected forcing function units and measuring devices to selected test station contacts. Each forcing function unit stores the digital test data directed to it in a shift register, which is operated by a source which is offset from ground potential by an offset voltage. The stored digital data is changed by a digital to analog converter to an analog signal which drives an analog summing amplifier to produce an analog test signal. The sign of the analog test signal may be inverted by a serially connected inverting amplifier connected to the analog summing amplifier by a control signal produced by the system control unit in accordance with the test program.

---

Figure 1:
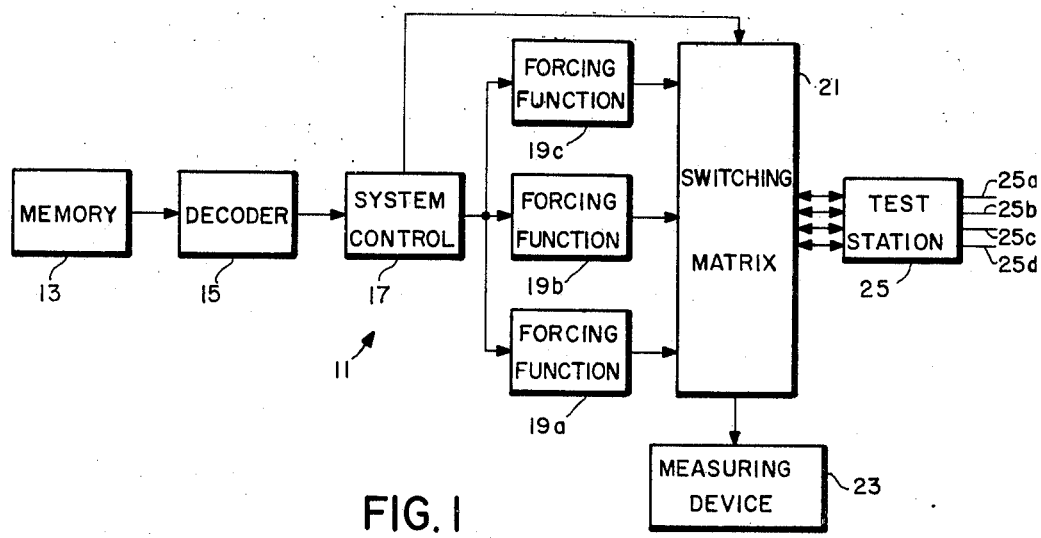

This invention relates to apparatus for performing a sequence of analog electrical tests upon a packaged integrated circuit in accordance with a stored digital test program.

In performing a series of analog electrical tests upon a packaged integrated circuit in accordance with a stored digital test program wherein selected analog test signals are applied to selected leads of the packaged integrated circuit, it is desirable to modify only the analog electrical signals which are different in successive tests. Due to the difficulty in maintaining the value of an analog electrical test signal produced by an analog electrical signal generator, it is desirable to store the value of the signal to be produced in a suitable digital-analog storage device at each analog electrical signal generator. To accommodate the digital-analog storage of the value of the analog signal to be produced, it is necessary to provide a digital to analog converter which has a desirably simple construction to interface between the digital storage portion and the analog signal generator. In addition it is desirable to eliminate any common current ground loops between the digital system and the analog system to substantially reduce the noise imparted to the analog system by the digital system.

Accordingly, it is a feature of the present invention to provide a test apparatus having a plurality of analog signal generators, each with a digital storage means interfaced with a simple digital to analog converter.

It is another feature of this invention to provide a test apparatus with a plurality of test signal generators, each having a digital system and an analog system operated by separate power sources and interfaced with each other in such a manner that a common current path does not exist between the separate power sources, and digital ground noise is not transferred to the analog circuitry by common ground paths.

It is a further feature of the invention to provide an offset voltage at each digital to analog converter between the digital and analog systems to enable the analog system, producing signals of single polarity, to be controlled by a digital system producing signals of opposite polarities.

In accordance with the present invention, a test apparatus is provided having a plurality of analog signal generators, each controlled by a digital system and interfaced therewith by a digital analog converter having a set of controllable current sources connected at a summing input terminal of the analog system and controlled by an associated set of control devices of the digital system. Both the digital and the analog systems have separate power sources which are interconnected by a voltage offset means to avoid a common ground return and thereby prevent any digital ground noise from being transferred to the analog system. In addition, the voltage offset between the digital and analog systems at the ground connection enables a single polarity digital system to operate between opposite polarities to control the single polarity analog system.

Figure 2:
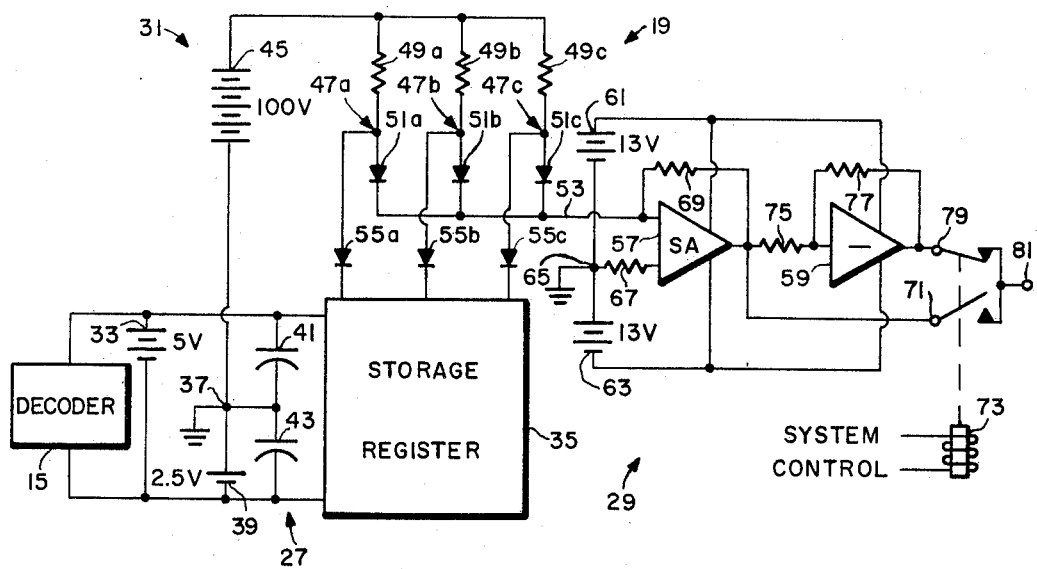

Still other objects, features and attendant advantages will become apparent to those skilled in the art from a reading of the following detailed description of the illustrative embodiment constructed in accordance with the invention, taken in conjunction with the accompanying drawings, wherein:

FIG. 1 is a block diagram of a test apparatus adapted to produce analog test signals in accordance with a stored digital test program, and FIG. 2 is a schematic diagram of the digital to analog interface between the digital and analog systems of the test apparatus.

Referring now in detail to the figures of the drawing, in FIG. 1 is shown a test apparatus adapted to perform a series of electrical tests on a packaged integrated circuit applying selected electrical analog test signals to selected leads of the integrated circuit and measure the result thereof, in accordance with a stored digital test program, to determine the electrical characteristics of the packaged integrated circuit. The test apparatus, generally indicated at 11, has a suitable memory unit 13 adapted to store a digital test program composed of a sequence of individual tests. The test program is stored in coded form with both test condition data and associated control instructions which may desirably be in alphanumeric form. The test program is fed from the memory unit 13 to a decoder 15 where the stored program is converted into a series of digital signals, thence to a system control unit 17 which distributes the test condition data to different forcing function units 19a, 19b and 19c according to the instructions associated with the test condition data. In addition, the system control unit 17 supplies control signals to the switching matrix 21 to connect the various forcing function units 19 as well as selected measuring units 23 to selected contact 25a of a test station 25 which are adapted to engage the terminals of an integrated circuit or other electrical circuit under test.

Each forcing function unit 19a, 19b and 19c stores the digital test data directed to it by the system control unit 17 and converts such digital data into an analog electrical test signal which is applied through the switching matrix 21 to a selected test station contact 25a. Each forcing function will maintain the value of the analog test signal in accordance with the stored digital test data until a subsequent test of the stored test program dictates that it be modified or until the end of the test program. Accordingly, after the initial test conditions are established, only selected forcing functions 19 are modified to perform the sequence of different tests in the test program, thereby simplifying the necessary instructions in performing the subsequent tests.

In FIG. 2 is illustrated the details of one of the forcing function units, generally indicated at 19, which has a digital system, generally indicated at 27, connected to an analog system, generally indicated at 29, by a digital to analog converter, generally indicated at 31. The digital system 27 including a 5 v. power source 33 connected in parallel through different current loops to the decoder unit 15 and a storage register 35 associated only with the particular illustrated forcing function unit. The storage register 35 has a set of storage devices, for example transistor switches, which are adapted to have one of two electrical conditions to collectively indicate the value of a test signal in digital form. The power source 33 of the digital system is connected to ground 37 by a 2.5 v. offset voltage source 39 to reference the digital system 27 to a −2.5 v. offset, thereby causing the storage register 35, along with the rest of the digital system 27, to operate between ±2.5 v. In addition, each terminal of the 5 v. digital power source 33 is connected by filtering capacitors 41 and 43 to ground 37 to filter transient noise currents.

The digital to analog converter, generally indicated at 31, includes a 100 v. reference source 45 serially connected between the ground terminal 37 and a plurality of controlled current summing sets, generally indicated at 47a, 47b and 47c, each of which has a weighted, current limiting resistor 49a, 49b and 49c respectively connected by a summing diode 51a, 51b and 51c respectively to a current summing junction 53 which is maintained at virtually ground potential. In addition, a control diode 55a, 55b and 55c is connected from the junction between the current limiting resistor 47 and the summing diode 51 to a bistable control device in the storage register 35. Accordingly, when any given bistable control device or devices, of the storage register 35 produces a signal of −2.5 v., the associated summing diode 51 is back biased by the voltage due to the current flowing from the 100 v. source 45, through the current limiting resistor 49, the control diode 55, the storage register 35 and the voltage offset 39 to the ground terminal. However, when any given bistable control device of the storage register 35 produces a signal of +2.5 v., the associated control diode 55 is back biased and the current from the 100 v. source 45 flows through the current limiting resistor 49 and the summing diode 51 to the summing junction 53.

The analog system, generally indicated at 29, includes two amplifiers 57 and 59 connected between a +13 v. and a −13 v. terminals provided by two analog power sources 61 and 63 oppositely connected to ground 65. The first amplifier 57 is a selective gain analog summing amplifier having one input connected by a resistor 67 to ground 65, and another input connected to the summing junction 53 of the digital to analog converter 31. The analog summing amplifier has an output connected by a feedback resistor 69 to the summing junction 53, to a first switch contact 71 of a relay 73 operated by the system control 17, and by a resistor 75 to the input of the second amplifier 59. The second amplifier 59 is a unit gain inverting amplifier adapted to change the sign of a signal applied to the input. The inverting amplifier 59 has an output connected by a feedback resistor 77 to the input, and to a switch contact 79 of the relay 73. The switch contacts 71 and 79 are mechanically connected with the second switch contact 79 being normally adapted to connect the output of the inverting amplifier 59 to an output terminal 81, and with first switch contact 71 being adapted to connect the output of the analog summing amplifier 57 to the output terminal 81 upon energization of the relay 73 by the system control 17. Accordingly, the analog signal output of the summing amplifier 57 is a function of the current applied to the first terminal, and the sign of the analog signal is controlled by the system control unit 17 in accordance with the stored test program which directs the system control unit 17 to apply a pulse to the relay 73 if a positive signal is desired.

In operation, a stored test program having a sequence of different tests in coded form and including both test condition data and accompanying control instructions are fed from the memory unit 13 to the decoder 15 where the test program is changed into a series of digital signals, i.e. the coded test data information is expressed in numerical values. The digital signals are received by the system control unit 17 where the test condition data is directed to the several forcing function units 19a, 19b and 19c in accordance with the accompanying control instructions. In addition, control instructions are directed to the switching matrix 21 which connects selected forcing function units to selected test station contacts and also connects one or more measuring devices 23 to the same or other selected test station contacts.

Upon receipt of the test condition data directed to it by the system control unit 17 each forcing function unit 19a, 19b and 19c stores the series of digital electrical signals in the storage register 35 operating between ±2.5 v. where they cause a set of bistable control devices contained therein to produce a control signal of either +2.5 volts or −2.5 volts according to the value of the digital signal directed to it. Depending on the value of the signal produced by each of the particular control devices, either all, none, or a portion of the current from the 100 v. reference source 45 will flow through all, none, or a portion of the control diodes 55a, 55b and 55c, the storage register 35 and the 2.5 v. offset voltage 39 with the remainder of the current, if any, flowing through the summing diodes 51a, 51b, and 51c to the summing junction 53 where the resultant signal biases the analog summing amplifier 57 to produce an analog electrical test signal. Since the analog summing amplifier 57 is an operational amplifier which normally produces an analog output signal having a sign opposite to that of the signal applied to the input terminal, the inverting amplifier 59 changes the analog test signal to a positive value. If the sign of the analog test signal is to be negative in accordance with the test being performed, the system control unit 17 will supply a control signal to the coil of the relay 73 to operate it and cause the switch 79 to open and the switch 71 to close to connect the negative output of the summing operational amplifier 57 directly to the output terminal 81 which is connected through the switching matrix 21 to a test station contact 25.

Upon completion of the test, the system control unit 17 will sequence another test instruction which will cause the value of selected forcing function units to be modified according to the requirements of the next test. All forcing functions 79 not requiring modification will be maintained at their previous value by the digital storage register 35 until the end of the stored test program is completed, at which time all units will be cleared by a suitable program instruction.

While the invention has been illustrated and described with respect to a single preferred embodiment, it will be apparent to those skilled in the art that various embodiments, modifications and improvements may be made without departing from the scope and spirit of the invention. Accordingly, it is to be understood that the invention is not to be limited by the illustrated embodiment, but only by the scope of the appended claims.

That which is claimed is:

1. Apparatus for performing a sequence of electrical tests on an electrical circuit to determine the electrical characteristics thereof comprising:
   a test station adapted to make test connections with an electrical circuit to be tested,
   a measuring device electrically connected to said test station and adapted to measure the value of an electrical signal at the test station,
   a forcing function unit electrically connected to said test station and adapted to apply an analog electrical test signal having a selected value to the test station in response to a digital test signal having one of two opposite polarity values with reference to ground, said forcing function unit having:
- an analog electrical signal generator with an input control terminal adapted to produce an analog electrical signal in response to a control current applied to the input control terminal,
- a reference voltage source connected to ground,
- a plurality of individually-weighted current summing units, each connected between the reference voltage source and a common summing junction at the input control terminal of the analog electrical generators, each current summing unit having a control signal input and being adapted to permit current to flow to the input terminal of the analog electric signal generator in response to a control signal of one polarity and adapted to block the flow of current to the input terminal in response to a control signal of opposite polarity,
- a plurality of individual digital signal means, each connected to a control signal input of a respective one of the plurality of individually controlled current summing units, and a voltage offset means connected between the plurality of individual digital signal means and ground to enable each of said digital signal means to produce two signals with respect to ground, each of said digital signal means including bistable control means operating from a source having a single polarity with reference to ground and being capable of producing a signal of one polarity substantially greater than the magnitude of the potential at the control signal input of its associated current summing unit and a signal of the opposite polarity substantially less than the potential at said control signal input, said control signal input being at other than ground potential.

2. Apparatus for performing a sequence of electrical tests on an electrical circuit according to claim 1:
said current summing units each having a current limiting resistor and a summing diode serially connected between said reference voltage source and said summing junction with a control diode connected between an individual digital signal means and the junction of the current limiting resistor and the summing diode.

3. Apparatus for performing a sequence of electrical tests on an electrical circuit according to claim 1:
said plurality of digital signal means comprising a digital storage register.

4. Apparatus for performing a sequence of electrical tests on an electrical circuit to determine the electrical characteristics thereof, comprising:
- a test station having a plurality of contacts each adapted to engage a terminal of an electrical circuit to be tested,
- a switching matrix having a plurality of electrical paths associated with each test station contact and adapted to connect selected electrical paths to the associated test station contact in response to selected control signals,
- a plurality of measuring devices each connected to one of the plurality of electrical paths of said switching matrix associated with an individual test station contact and adapted to measure the value of the electrical signal at said associated test station contact,
- a plurality of digital to analog converters each connected to a separate electrical path of the plurality of electrical paths associated with each test station contact and adapted to convert a digital signal into an analog signal in response to a control signal,
- a system control unit operatively connected in controlling relation with said switching matrix to connect selected electrical paths to the associated test station contacts and each of said digital to analog converters and adapted to sequentially receive digital test condition data and associated control instructions and direct the test data to selected digital to analog converters in accordance with the associated instructions, each of said digital to analog converters including:
- an analog operational amplifier adapted to produce an analog electrical signal with reference to ground potential in response to a current signal,
- a digital power supply,
- a storage register operated by said digital power supply and adapted to produce a set of digital electrical signals having substantially one of two different electrical values in response to the test condition data received from said system control,
- an offset voltage reference means connecting the negative terminal of the digital power supply to ground potential by a potential less than that produced by the digital power supply,
- a digital-analog interface including a reference potential,
- a plurality of serially connected current limiting resistors and summing diodes each connecting said reference potential to a common summing junction at the input of said analog operational amplifier, and
- a plurality of control diodes each connecting the junction between the serially connected current limiting resistor and summing diode to one of the storage devices of said storage register.

References Cited

UNITED STATES PATENTS 3,237,100    2/1966    Chalfin    324—73
3,286,175    11/1966    Gerbier    324—73

WILLIAM F. LINDQUIST, Primary Examiner

E. L. STOLARUN, Assistant Examiner

U.S. Cl. X.R.

340—347